(12) United States Patent
Singh

(10) Patent No.: US 7,474,959 B2
(45) Date of Patent: Jan. 6, 2009

(54) METHOD FOR PROVIDING RECOMMENDATIONS USING IMAGE, LOCATION DATA, AND ANNOTATIONS

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 875 days.

(21) Appl. No.: 10/961,623

(22) Filed: Oct. 8, 2004

(65) Prior Publication Data
US 2007/0195373 A1 Aug. 23, 2007

(51) Int. Cl.
*G01C 21/30* (2006.01)
*H04N 13/02* (2006.01)
*G08G 1/13* (2006.01)

(52) U.S. Cl. ............... 701/207; 701/209; 701/210; 701/211; 340/463; 382/291

(58) Field of Classification Search ............... 701/200, 701/201, 208, 209, 211, 207; 348/113, 116, 348/135, 137; 340/995.1, 995.19, 463; 382/291, 382/295
See application file for complete search history.

(56) References Cited

U.S. PATENT DOCUMENTS

| | | | |
|---|---|---|---|
| 6,199,014 B1 * | 3/2001 | Walker et al. | 701/211 |
| 6,282,489 B1 | 8/2001 | Bellesfield et al. | |
| 6,351,710 B1 * | 2/2002 | Mays | 701/211 |
| 6,704,646 B2 * | 3/2004 | Cochlovius et al. | 701/208 |
| 7,184,611 B2 * | 2/2007 | Miyagi et al. | 382/291 |
| 7,191,059 B2 * | 3/2007 | Asahara | 701/209 |
| 2005/0119826 A1 * | 6/2005 | Lee et al. | 701/209 |
| 2006/0041375 A1 * | 2/2006 | Witmer et al. | 701/208 |
| 2007/0143009 A1 * | 6/2007 | Nomura et al. | 701/208 |
| 2007/0150188 A1 * | 6/2007 | Rosenberg | 701/211 |

\* cited by examiner

*Primary Examiner*—Tan Q. Nguyen

(57) ABSTRACT

A method for providing information with digital images includes receiving a digital image of a subject, the digital image including as metadata a geographic position of the subject and other information associated with generating a path to the subject. A path to the subject from the source location can then be generated based on a geographic position of the source location and the metadata included with the digital image. The metadata can be stored on a mobile device and an alert provided when the mobile device is near the geographic position of the subject or if a trajectory of the mobile device does not match the generated path. Relationships with other digital images having associated metadata may also be included. Thus, users have the ability to use their image capture devices to intelligently share digital images of subjects and knowledge of the subjects, delivering greater value from these devices.

47 Claims, 8 Drawing Sheets

METHOD FOR PROVIDING RECOMMENDATIONS USING IMAGE, LOCATION DATA, AND ANNOTATIONS

FIELD OF THE INVENTION

The present invention relates to photo sharing services, and more particularly to sharing annotations with the digital images in web photo sharing services.

BACKGROUND OF THE INVENTION

Many people, especially travelers, explorers, and hobbyists, use digital image capture devices, such as digital cameras, camera cell phones, personal digital assistants, to capture images of interesting subjects. They assemble these images onto web sites or travelogues or otherwise share these pictures with others.

Typically, the digital images are uploaded and any information the user wishes to share, such as location coordinates, text descriptions, and/or voice comments are then appended as annotations to the images. However, this appended information is limited, both in its scope and in its use. The digital image capture device that receives these images is not able to actively interface with the user based on this appended information in a meaningful fashion.

Accordingly, there exists a need for an improved method for providing recommendations with digital images in the sharing of the digital images. The method should append information to digital images that allow a digital image capture device to more actively and meaningfully interact with a recipient of the images. Possible appended information should include a recommended direction of approach to a location of the image subject and relationships between images. The method should also allow alerts if the recommendations are being violated, alerts if the user is near the location of a selected image subject, and allow the user to request a path to the location. The present invention addresses such a need.

SUMMARY OF THE INVENTION

A method for providing information with digital images includes receiving a digital image of a subject, the digital image including as metadata a geographic position of the subject and other information associated with generating a path to the subject. A path to the subject from the source location can then be generated based on a geographic position of the source location and the metadata included with the digital image. The metadata can be stored on a mobile device and an alert provided when the mobile device is near the geographic position of the subject or if a trajectory of the mobile device does not match the generated path. Relationships with other digital images having associated metadata may also be included. In this manner, users have the ability to use their image capture devices to intelligently share digital images of subjects and knowledge of the subjects, delivering greater value from these devices.

DETAILED DESCRIPTION

The present invention provides a method for providing information with digital images in the sharing of the digital images. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
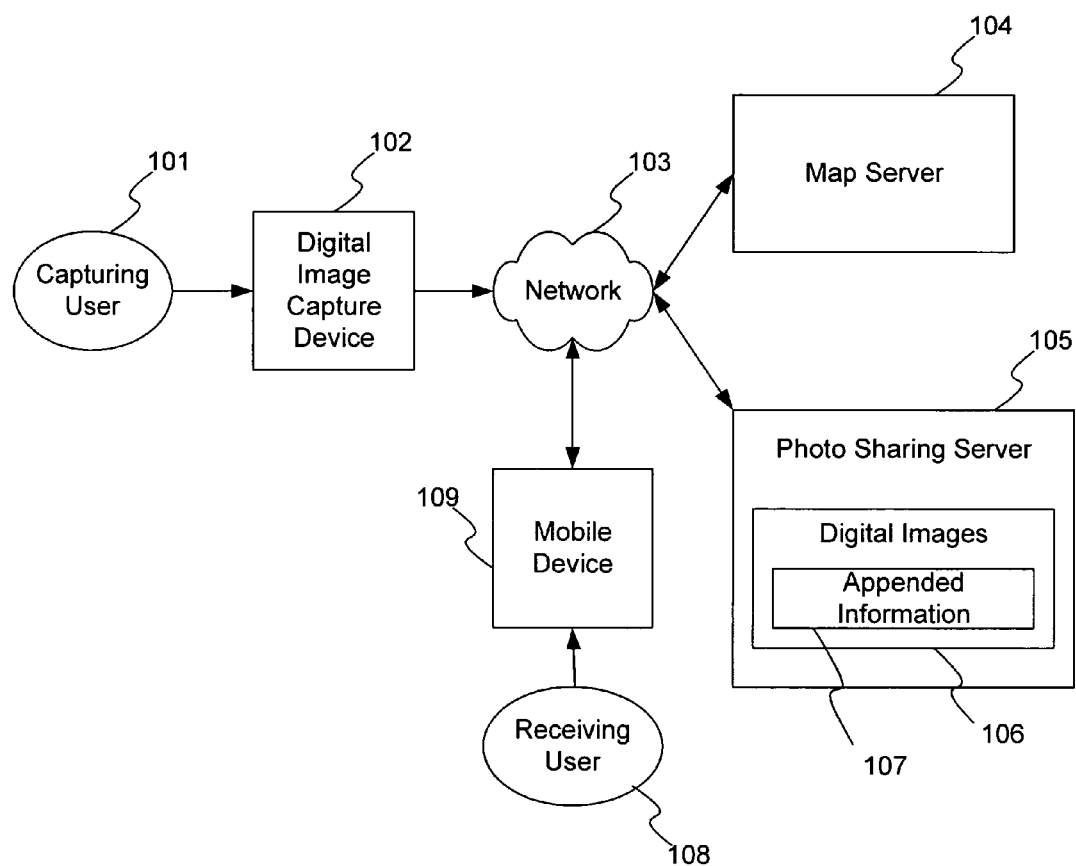
FIG. 1 illustrates a preferred embodiment of a system for providing information with digital images in the sharing of the digital images in accordance with the present invention.

FIG. 1 illustrates a preferred embodiment of a system for providing information with digital images in the sharing of the digital images in accordance with the present invention. The system includes an image capture device 102, such as a digital camera, a camera phone, a personal digital assistant including an image capture subsystem, etc. The device 102 is used by a capturing user 101 to capture images of various subjects. The device 102 can upload any captured digital images 106 onto the photo sharing server 105, via a network 103, such as the Internet. The digital images 106 include information 107 appended to them as metadata. The information 107 includes location data and user specified annotations. The location data can include the geographical coordinates and/or altitude of the subject that can be provided by global positioning system (GPS) unit (not shown) included in the device 102.

The user specified annotations may include any information the capturing user 101 wishes to share with receiving users 108, including information other than the geographical coordinates of the subject that can be used in generating a path to the subject. For example, the annotations can provide a recommended direction of approach to the location, relationships between multiple images, or any other information that allow the receiving user 108 to more meaningfully interact with the images. The receiving users 108 can then access the digital images 106, along with the appended information 107, using a mobile device 109, such as a cell phone, camera phone, PDA, wireless digital camera, navigational system or device, and the like. The mobile device 109 can receive the digital images 106 and appended information 107 by accessing the photo sharing server 105 via the network 103.

Figure 2:
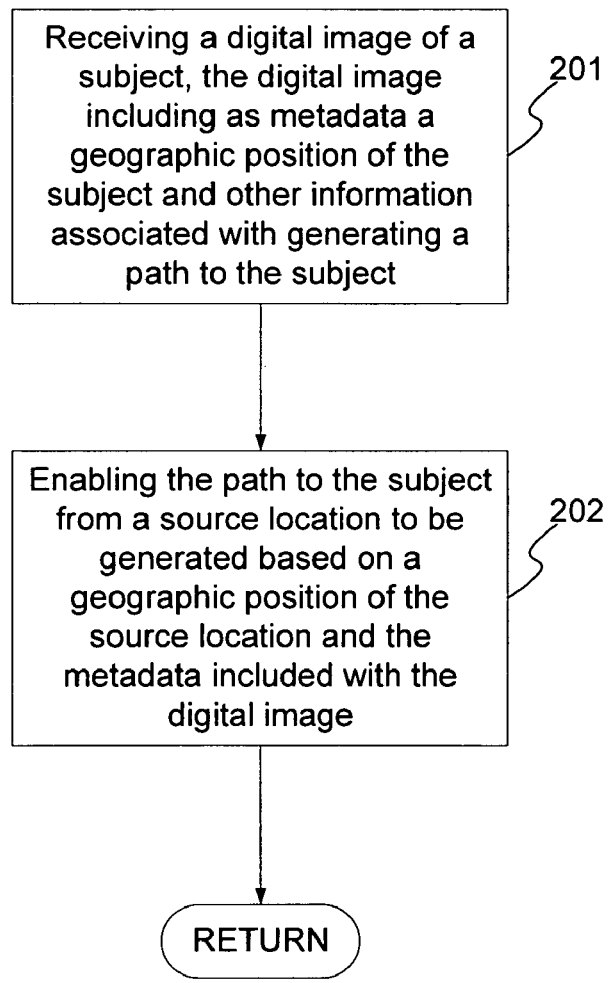
FIG. 2 is a flowchart illustrating a preferred embodiment of a method for providing information with digital images in the context of generating paths.

FIG. 2 is a flowchart illustrating a preferred embodiment of a method for providing information with digital images in the context of generating paths. First, a digital image of a subject is received, via step 201, with the digital image including as metadata a geographic position of the subject and other information associated with generating a path to the subject. For example, the user 101 can capture a digital image 106 of the subject. The geographic position of the subject and the other information associated with generating a path to the subject is then appended to the digital image 106 as part of the appended information 107. The digital image 106 and its appended information 107 are then uploaded to a photo sharing server 105. They can be uploaded and displayed as part of a web site. Other users 108 can then access this web site, and their respective mobile devices 109 can receive the digital image 106 and its information 107. However, the digital image 106 and information 107 can also be shared directly between users without departing from the spirit and scope of the present invention. Once the digital image is received, the path to the subject from a source location may be generated based on a geographic location of the source location and the metadata included with the digital image, via step 202.

Figure 3:
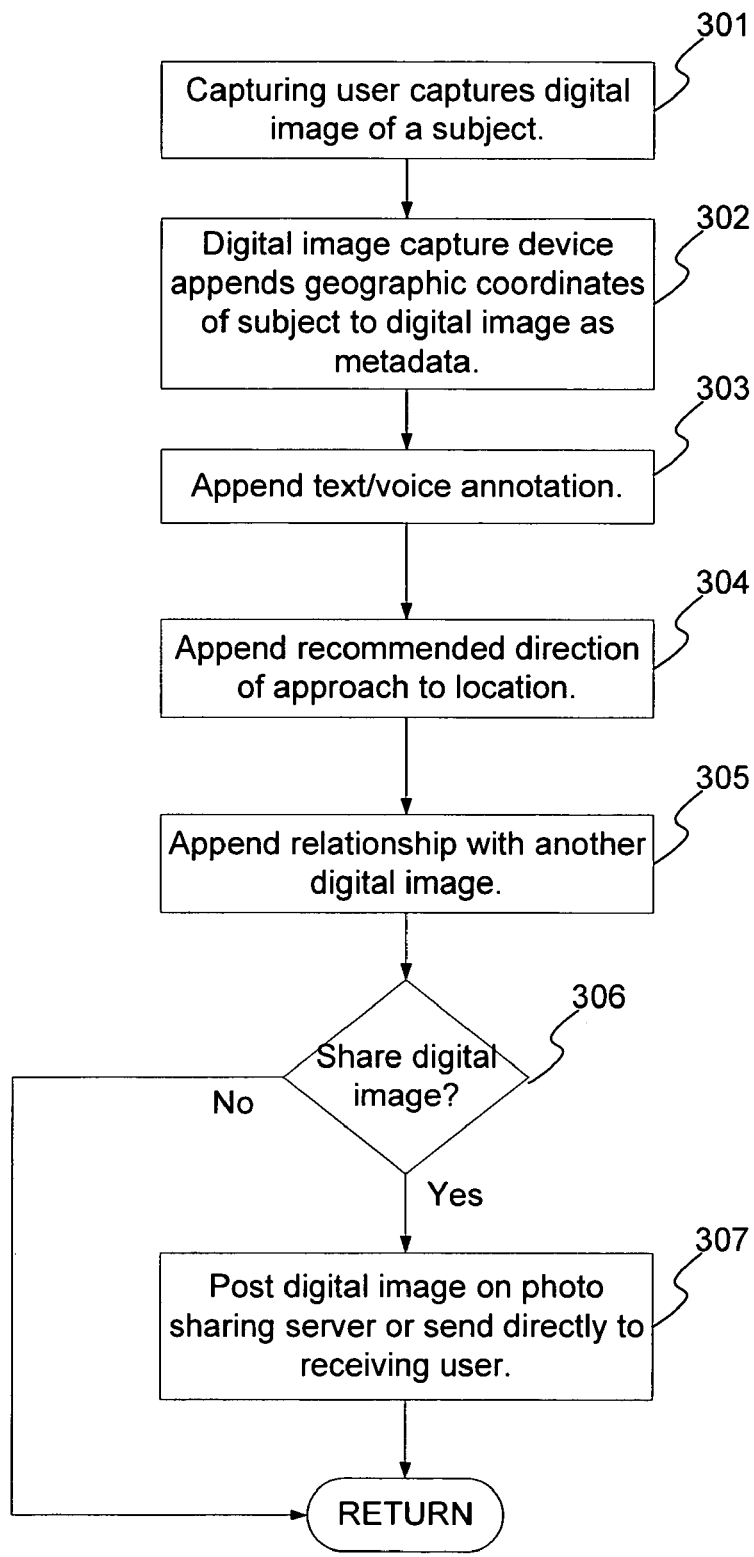
FIG. 3 is a flowchart illustrating in more detail the method illustrated in FIG. 2 for providing information with digital images in the context of appending information to the digital images used in generating paths.

FIG. 3 is a flowchart illustrating in more detail the method of FIG. 2 for providing information with digital images in the context of appending information to the digital images used in generating paths. First, the capturing user 101 captures a digital image of a subject, via step 301. The digital image capture device 102 then appends the location of the subject 302 to the image, via step 302. In this embodiment, the location information is geographical coordinates of the subject, provided, for example, by the GPS unit described above. Optionally, the user 101 may append text and/or voice annotations to the image, via step 303. The user 101 also appends a recommended direction of approach to the location, via step 304. For example, the device 102 can capture the user's 101 direction of approach in visiting the location. Then, perhaps with the help of a map server 104 coupled to the device 102 as shown in FIG. 1 or a GPS unit included in the capture device, the device 102 specifies a compass direction for the approach or a street name and appends this information to the image.

Optionally, the user 101 may also specify and append a relationship of the image with another digital image, via step 305. The relationship can be a grouping of the digital images or a recommended order of visitation of locations in digital images. For example, the user 101 may scroll through previously captured images, selects one or more of the images, and then selects an operator to define the relationship between the captured image and the selected images. The operator can be binary operators, such as AND, BEFORE, AFTER, etc. For example, the user 101 may wish to indicate that one who visits the location in an image should also visit locations in other images. The user 101 can select the relevant previously captured images and the AND operator to define this relationship. This relationship is then appended to the captured image.

If the user 101 wishes to share the captured digital image, via step 306, then the image is posted on the photo sharing server 105, or alternatively, it can be sent directly to a receiving user's 108 mobile device 109, via step 307. The receiving user 108 then receives the digital image and can view/play the text/voice annotations, view the recommended direction of approach, and/or view the relationships the digital image has with any other digital images.

For example, assume that the user 101 takes a trip on a scenic route. As the user 101 passes an interesting place, he notices a particularly exciting scene. He takes an image of this scene with the digital image capture device 102, via step 301. The device 102 automatically records the geographical coordinates of the place using, for example, the GPS unit described above. The device 102 can then append the geographical coordinates to the image as metadata, via step 302. The user 101 can also specify that a recommended direction of approach to the subject be appended to the image 106 as metadata, via step 304, such as "approach from the East". The user 101 places this image with the appended geographical coordinates and recommended direction of approach on a travel web site, via steps 306-307. Another user 108, who has an interest in the same geographical region, can retrieve the images and its appended information.

For another example, assume that a user 101 takes a road or train trip and captures images of interesting sights seen through the windows, via step 301. These sights can include those that are otherwise unmarked on guidebooks and may just reflect the user's personal judgment about beauty and interestingness. The user 101 may wish to share the images with others of similar hobbies or interests. The user 101 can then include annotations concerning a recommended direction of approach to the sights, as well as the relevant hobby or interest topic and/or a description of how the image relates to that topic. These annotations, along with location data for the sights, are appended to the images captured by the user 101, via steps 302-304. For example, birders or botanists may have special reasons to take a certain picture, as would history buffs, archaeologists, or people with an interest in bridges. The user 101 can then share these images and knowledge of the sights with other users 108, via steps 306-307.

For another example, in commercial settings, the user 101 can capture an image of an item in a store that is a good deal, such as a rug, dress, or furniture, via step 301. In some cases, an image of the item is more helpful to other users than a description with words. The user 101 can include directions to the store, as well as the name of the store, the price of the item, and any other helpful information. These information are then appended to the captured image, via steps 302-305. The user 101 can now share the image and its appended information with family and friends, via steps 306-307.

Figure 4:
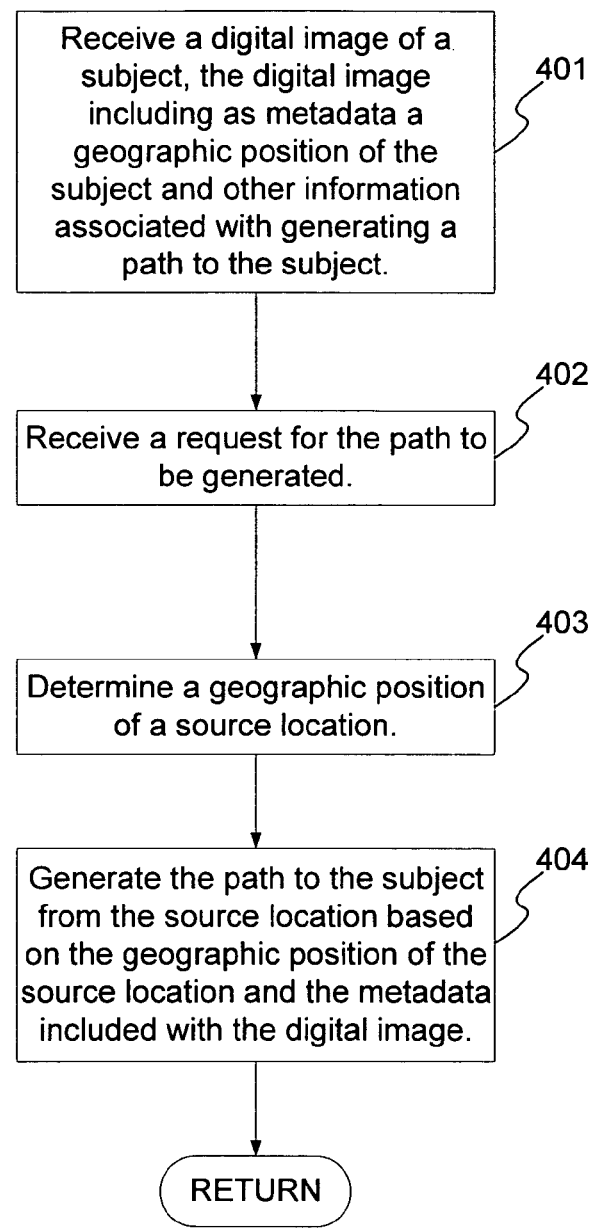
FIG. 4 is a flowchart illustrating a more detailed embodiment of the path request option provided by the method in accordance with the present invention.

Once the receiving user 108 receives the digital images captured by the capturing user 101, the method in accordance with the present invention can provide the option for the receiving user 108 to select one or more of the digital images prior to visiting the location in the images and to request paths to the locations. FIG. 4 is a flowchart illustrating a preferred embodiment of the path request option provided by the method in accordance with the present invention. A digital image of a subject including as metadata a geographic position of the subject and other information associated with generating a path to the subject is first received, via step 401. For example, the digital image can be received by the mobile device 109. Next, a request for the path to the subject is received, via step 402. For example, the user 108 can select the digital image on the mobile device 109 to request the path to the subject of the digital image. A geographic position of a source location is then determined, via step 403. The source location is the starting point of the path and can be the position of the mobile device 109 or the receiving user 108 requesting the path. Then, the path to the subject from the source location is generated based on the geographic position of the source location and the metadata included with the digital image, via step 404.

Figure 5:
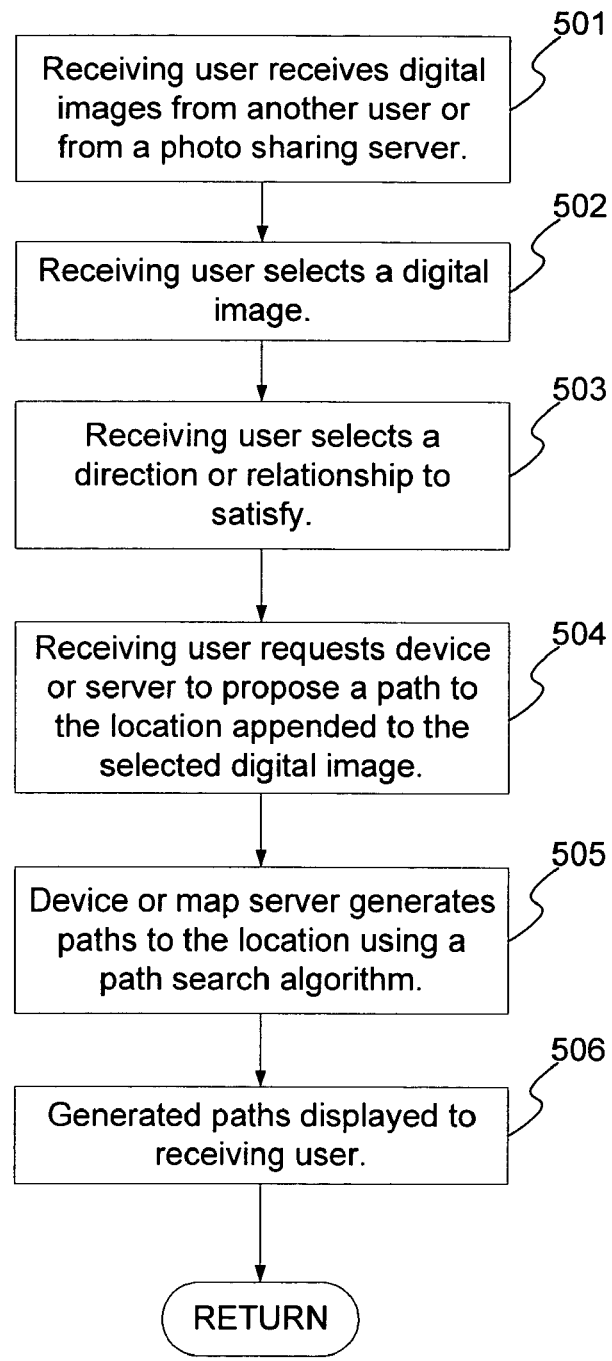
FIG. 5 is a flowchart illustrating an example of the path request option provided by the method in accordance with the present invention.

FIG. 5 is a flowchart illustrating an example of the path request option provided by the method in accordance with the present invention. First, the receiving user 108 receives digital images onto his device 109, either from the photo sharing server 105 or directly from the capturing user 101, via step 501. The receiving user 108 can then select a digital image, via step 502. For the selected digital image, the receiving user 108 selects any direction or relationship needed to satisfy an informational message, prompt, or alert by the mobile device 109, via step 503. For example, if the digital image has appended to it several recommended streets for approaching the location, the receiving user 108 can select one of the recommended directions. If the digital image has appended to it a "visit after" relationship with more than one digital image, the receiving user 108 can select which location to visit afterwards. Alternatively, rather than a receiving user 108 having to explicitly select images 106 in step 501, any received image in the mobile device 109 can automatically generate the informational messages, prompts, or alerts for the receiving user 108 as the mobile device 109 nears the location of the image subject.

Next, the receiving user 108 requests that the device 109 or the map server 104 generate paths to the location using a path search algorithm, via step 505. This device 109 can be configured to automatically determine whether the map server 104 or device 109 is to generate the paths, or the choice can be determined by the device 109 based on its inherent capabilities. Path search algorithms are known in the art and will not be described here. The device 109 or map server 104 can generate the paths, and the generated paths can be displayed to the receiving user 108 using the mobile device 109, via step 506. When generated by the mobile device 109, the device 109 can use the other information included as metadata, such as a recommended direction of approach, to generate a recommended path to the subject.

When the map server 104 is used to generate the path, the mobile device 109 Can send the receiving user's current location to the map server 104 as a source location in the generated path, for example, using the device's 109 GPS unit described above. The mobile device can also send the geographic position of the subject of the digital image 106 that is included as metadata to the image to map server 104. Using this positional information, the map server 104 can generate a path from the source location to the subject using the above-described path search algorithms. The generated path can then be downloaded to the mobile device 109 from the map server 104 to provide informational messages, prompts, or alerts to the receiving user 108.

According to another exemplary embodiment, the mobile device 109 can modify the geographic position of the subject or the source location prior to sending this data as positional information to the map server 104. The modification can be based on the other information included as metadata with the digital image 106, such as a recommended direction of approach to the subject. The map server 104 can then generate the path to the subject using the modified positional information, such that the other information included with the digital information as metadata can be indirectly considered by the map server 104 in generating the path. Alternatively, the map server 104 can be configured to directly consider the other information included as metadata to generate the desired path. Again, once generated, the path to the subject can downloaded to the mobile device 109 from the map server 104 to provide informational messages, prompts, or alerts to the receiving user 108.

Figure 6:
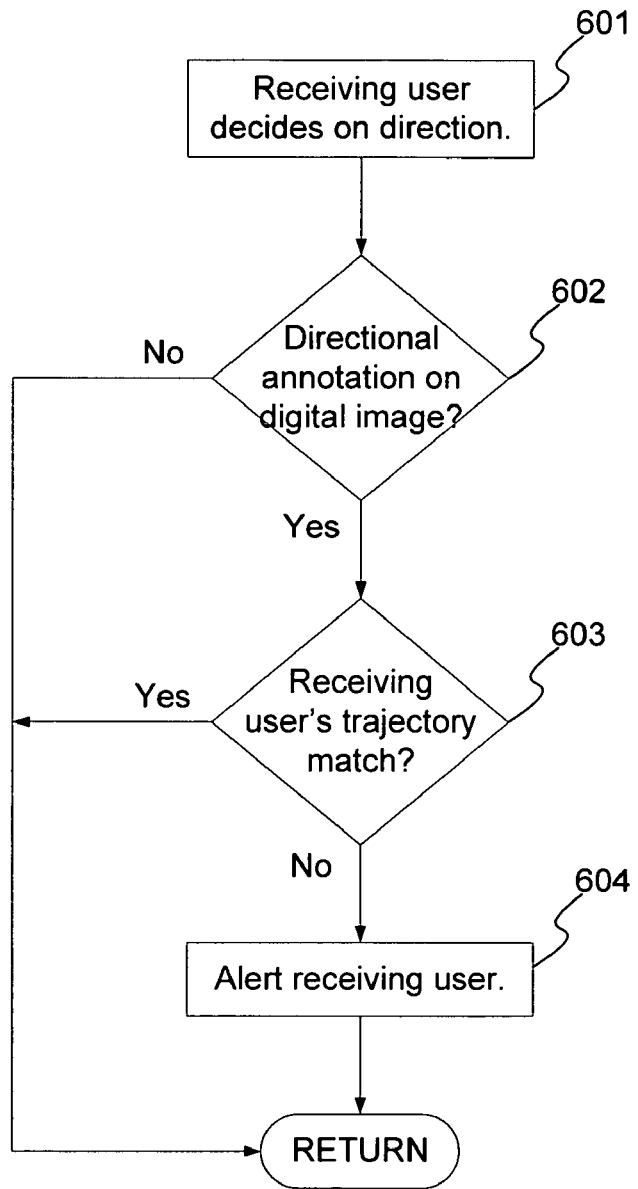
FIG. 6 is flowchart illustrating an example of the violation alert option provided by the method in accordance with the present invention.

The method in accordance with the present invention further provides the option for the receiving user 108 to receive alerts from the device 109 when the receiving user 108 violates the recommended direction of approach or path. FIG. 6 is flowchart illustrating an example of the violation alert option provided by the method in accordance with the present invention. First, the receiving user 108 decides on a direction to a location in a digital image, via step 601. The device 109 then determines if the digital image has a directional annotation, via step 602. The directional annotation includes a recommended direction of approach or a path, as described above. If there is a directional annotation, the device 109 determines if the receiving user's trajectory matches, via step 603. For example, the device 109 can receive the receiving user's current location using the GPS unit described above, and can use a plurality of this information to calculate the receiving user's trajectory. If the receiving user's trajectory does not match the directional annotation, then the device 109 sends an alert to the receiving user 108, via step 604.

Figure 7:
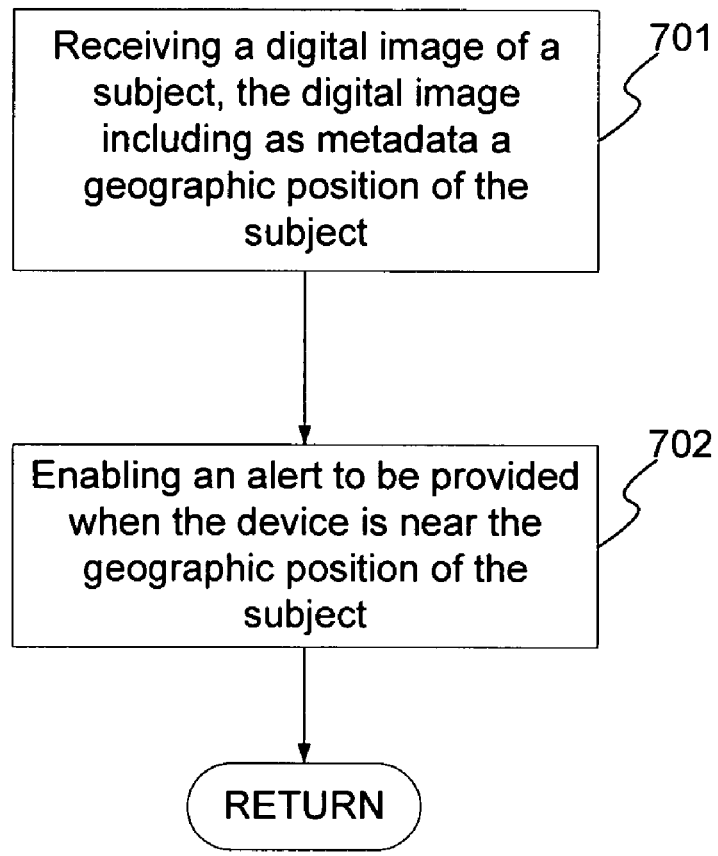
FIG. 7 is a flowchart illustrating a preferred embodiment of the alert option of a nearby location provided by the method in accordance with the present invention.

The method in accordance with the present invention further provides the option for the receiving user 108 to receive alerts from the device 109 when the receiving user 108 is near the location in the image. FIG. 7 is a flowchart illustrating a preferred embodiment of the alert option of a nearby location provided by the method in accordance with the present invention. First, a digital image of a subject is received, via step 701, the digital image including as metadata a geographic position of the subject. For example, the digital image can be received by the mobile device 109. Then, an alert may be provided when the device is near the geographic position of the subject, via step 702.

For example, the receiving user 108 downloads digital images onto his device 109 prior to or during a visit to the given geographical region, via step 701. As the receiving user 108 moves through the region, he may come close to one or more of the locations in the digital images. The receiving user's device 109 would then alert him to the location being nearby and show the receiving user 108 the digital image of it, via step 702. If the receiving user 108 is interested, he can proceed to that location using the recommended direction of approach.

Figure 8:
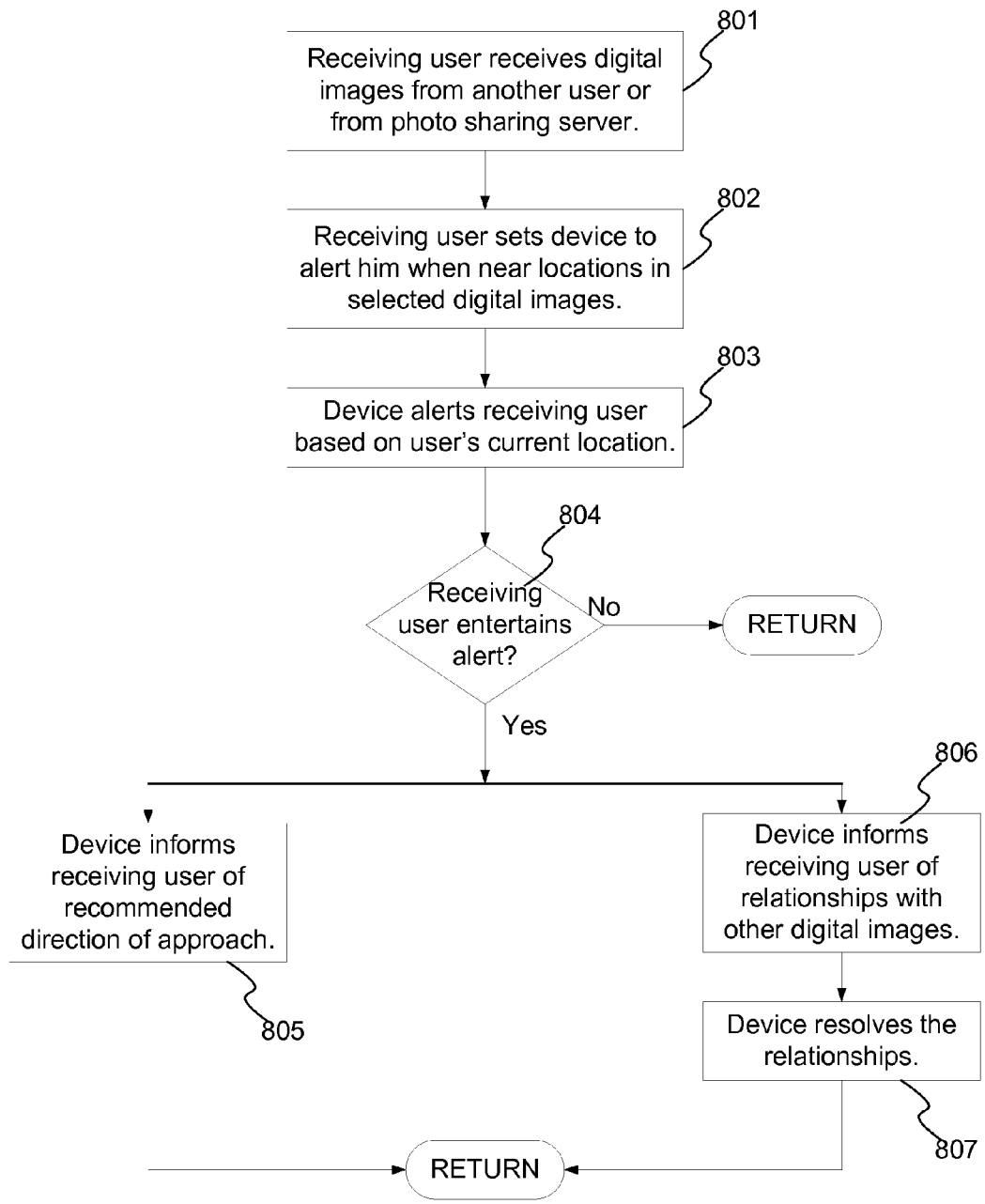
FIG. 8 is a flowchart illustrating in more detail the alert option of a nearby location provided by the method in accordance with the present invention.

FIG. 8 is a flowchart illustrating in more detail the alert option of a nearby location provided by the method in accordance with the present invention. First, the user 108 receives digital images from another user or from a photo sharing server, via step 801. The receiving user 108 sets his device 109 to alert him when he is near the locations in the selected digital images, via step 802. The device 109 then sends alerts to the receiving user 108 based on his current location, via step 803, when the receiving user 108 nears one of the locations. If the receiving user 108 entertains the alert, via step 804, i.e., decides to visit the location, the device 109 can then display any of the appended information 107 to the receiving user 108.

For example, if the digital image pertaining to the alert includes a recommended direction of approach, then the device 109 informs the receiving user 108 of the recommendation, via step 805. If the digital image pertaining to the alert includes relationships with other digital images, then the device 109 informs the receiving user 108 of these relationships, via step 806. The device 109 then resolves these relationships, via step 807. For example, assume that the relationship is image X before image Y. If the location in image X is visited first, the receiving user 108 is reminded to visit the location in of image Y later. If the location in image Y is to be visited, the receiving user 108 is alerted that he should visit the location in image X first.

Although the preferred embodiment is described with the above combinations, one of ordinary skill in the art will understand that each feature can be provided independently of each other and in any number of combinations without departing from the spirit and scope of the present invention.

A method for providing information with digital images in the sharing of the digital images has been disclosed. The method appends information to digital images captured by a user, including a recommended direction of approach. Relationships with other digital images may also be appended.

These images can then be uploaded to a photo sharing server via a network. Other users can access the photo sharing server via the network and view the images and the appended information. The receiving users have the option to request a path to a location in a digital image, request alerts when a recommendation is violated, or request alerts when the user is near a location in a digital image. In this manner, users have the ability to use their image capture devices to intelligently share digital images of subjects and knowledge of the subjects. This intelligent sharing enables the users to carry on deeper interactions via the use of their devices, thus delivering greater value from these devices.

The executable instructions of a computer program as illustrated in FIGS. 2-8 for providing information using digital images can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium, such as a removable storage device. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing information using digital images, the information associated with generating a path to the location of the subject of a digital image, comprising:
   receiving a digital image of a subject, the digital image including as metadata a geographic position of the subject and the information associated with generating a path to the subject;
   wherein the path to the subject from a source location is generated based on a geographic position of the source location and the metadata included with the digital image.

2. The method of claim 1, wherein the other information comprises a recommended direction of approach to the subject.

3. The method of claim 1, wherein the other information comprises a relationship between the digital image and another digital image having associated metadata.

4. The method of claim 3, wherein the relationship comprises a grouping of digital images each having associated metadata.

5. The method of claim 3, wherein the relationship comprises a recommended order of visitation of locations associated with the digital images.

6. The method of claim 1, wherein the digital image and metadata are received in a mobile device, the method further comprising:
   providing an alert if the mobile device nears the geographic position of the subject or if a trajectory of the mobile device does not match the generated path.

7. The method of claim 6, further comprising:
   displaying the digital image when the mobile device nears the geographic position of the subject.

8. The method of claim 6, further comprising:
   displaying a recommended direction of approach when the mobile device nears the geographic position of the subject.

9. The method of claim 6, further comprising:
   displaying a relationship between the digital image and another digital image received in the mobile device when the mobile device nears the geographic position of the subject.

10. The method of claim 6, wherein the path to the subject is generated by the mobile device.

11. The method of claim 1, comprising:
    receiving the digital image and metadata in a photo sharing server from a digital image capture device; and
    sending the digital image and metadata from the photo sharing server to a mobile device.

12. A computer readable medium containing a computer program for providing information using digital images, the computer program comprising executable instructions for:
    receiving a digital image of a subject, the digital image including as metadata a geographic position of the subject and other information associated with generating a path to the subject; and
    generating the path to the subject from a source location based on a geographic position of the source location and the metadata included with the digital image.

13. The computer readable medium of claim 12, wherein the other information comprises a recommended direction of approach to the subject.

14. The computer readable medium of claim 12, wherein the other information comprises a relationship between the digital image and another digital image having associated metadata.

15. The computer readable medium of claim 12, further comprising executable instructions for:
    providing an alert if the generated path is not being followed or if the geographic position of the subject is near a current location.

16. A system, comprising:
    a photo sharing server configured to receive a digital image of a subject and provide the digital image to a device of a user, the digital image including as metadata a geographic position of the subject and other information associated with generating a path to the subject; and
    means for generating the path to the subject from a source location of the user based on a geographic position of the source location and the metadata included with the digital image.

17. The system of claim 16, wherein the other information comprises a recommended direction of approach to the subject.

18. The system of claim 16, wherein the other information comprises a relationship between the digital image and another digital image having associated metadata.

19. The system of claim 16, comprising:
    a mobile device for receiving the digital image from the photo sharing server, wherein the mobile device provides an alert if the mobile device nears the geographic position of the subject or if a trajectory of the mobile device does not match the generated path.

20. The system of claim 19, wherein the means for generating the path is integral to the mobile device.

21. The system of claim 19 wherein the means for generating the path comprises a map server configured to receive geographic positional information based on the geographic positions of the subject and the source location and to generate therefrom the path to the subject from the source location.

22. The system of claim 21, wherein the mobile device is configured to modify the geographic position of the subject or the source location prior to sending the positional information to the map server, the modification based on the other information associated with generating the path to the subject.

23. A device, comprising:
a digital image of a subject that includes appended metadata, wherein the appended metadata comprises a geographic position of the subject and other information associated with generating a path to the subject,
wherein the device determines a geographic position of a source location, and generates the path to the subject from the source location based on the geographic position of the source location and the metadata appended to the digital image.

24. The device of claim 23, wherein the other information comprises a recommended direction of approach to the subject.

25. The device of claim 23, wherein the other information comprises a relationship between the digital image and an other digital image having associated metadata.

26. The device of claim 25, wherein the relationship comprises a grouping of digital images each having associated metadata.

27. The device of claim 25, wherein the relationship comprises a recommended order of visitation of locations associated with the digital image and the other digital image.

28. The device of claim 23, wherein the device further provides an alert if the device is not following the path or if the device nears the geographic position of the subject.

29. The device of claim 28, wherein the device further determines if the device's trajectory matches the path and provides the alert if the device's trajectory does not match the path.

30. The device of claim 28, wherein the device further displays the digital image when the device nears the geographic position of the subject.

31. The device of claim 28, wherein the device further displays a recommended direction of approach when the device nears the geographic position of the subject.

32. The device of claim 28, wherein the device further displays a relationship between the digital image and another digital image having associated metadata when the device nears the geographic position of the subject.

33. A method for providing information using digital images, comprising:
receiving, by a device, a digital image of a subject, the digital image including as metadata a geographic position of the subject; and
providing an alert when the device is near the geographic position of the subject.

34. The method of claim 33, wherein the metadata comprises a recommended direction of approach to the subject and the alert includes the recommended direction of approach.

35. The method of claim 33, wherein the metadata further comprises other information comprising a relationship between the digital image and another digital image.

36. The method of claim 33, further comprising:
displaying a relationship between the digital image with another digital image in the alert.

37. A computer readable medium containing a computer program for providing information using digital images, the computer program comprising executable instructions for:
receiving a digital image of a subject, the digital image including as metadata a geographic position of the subject; and
providing an alert when the device is near the geographic position of the subject.

38. The computer readable medium of claim 37, wherein the metadata comprises a recommended direction of approach to the subject and the alert includes the recommended direction of approach.

39. The computer readable medium of claim 37, wherein the metadata further comprises other information comprising a relationship between the digital image and another digital image.

40. A system, comprising:
a photo sharing server configured to receive a digital image of a subject, the digital image including as metadata a geographic position of the subject; and
a mobile device for receiving the digital image and metadata from the photo sharing server, wherein the mobile device is configured to provide an alert when the mobile device nears the geographic position of the subject.

41. The system of claim 40, wherein the metadata comprises a recommended direction of approach to the subject and the alert includes the recommended direction of approach.

42. The system of claim 40, wherein the metadata further comprises other information comprising a relationship between the digital image and an other digital image.

43. The system of claim 42, wherein the mobile device displays the relationship between the digital image and the other digital image as the alert.

44. A device, comprising:
a digital image of a subject comprising appended metadata, wherein the appended metadata comprises a geographic position of the subject, wherein the device is configured to provide an alert when the device is near the geographic position of the subject.

45. The device of claim 44, wherein the metadata comprises a recommended direction of approach to the subject and the alert includes the recommended direction of approach.

46. The device of claim 44, wherein the appended metadata further comprises a relationship between the digital image and an other digital image.

47. The device of claim 46, wherein the device displays the relationship between the digital image and the other digital image as the alert.

* * * * *